United States Patent
Hong et al.

(10) Patent No.: US 6,791,544 B1
(45) Date of Patent: Sep. 14, 2004

(54) SHADOW RENDERING SYSTEM AND METHOD

(75) Inventors: Zhou Hong, San Jose, CA (US); Konstantine Iourcha, San Jose, CA (US)

(73) Assignee: S3 Graphics Co., Ltd., Grand Cayman (KN)

( * ) Notice: Subject to any disclaimer, the term of this patent is extended or adjusted under 35 U.S.C. 154(b) by 0 days.

(21) Appl. No.: 09/664,283

(22) Filed: Sep. 18, 2000

Related U.S. Application Data

(60) Provisional application No. 60/195,230, filed on Apr. 6, 2000.

(51) Int. Cl.[7] ............................................. G06T 15/60
(52) U.S. Cl. ...................................................... 345/426
(58) Field of Search ................................. 345/426, 419, 345/421, 422

(56) References Cited

U.S. PATENT DOCUMENTS

| | | | | |
|---|---|---|---|---|
| 5,568,595 A | * | 10/1996 | Yosefi et al. | 345/426 |
| 5,742,749 A | * | 4/1998 | Foran et al. | 345/426 |
| 5,825,365 A | * | 10/1998 | Hirota et al. | 345/678 |
| 6,018,350 A | * | 1/2000 | Lee et al. | 345/426 |
| 6,226,000 B1 | * | 5/2001 | Richens et al. | 345/419 |
| 6,356,272 B1 | * | 3/2002 | Matsumoto et al. | 345/582 |
| 6,373,496 B1 | * | 4/2002 | Iourcha | 345/587 |
| 6,437,782 B1 | * | 8/2002 | Pieragostini et al. | 345/426 |
| 6,441,817 B1 | * | 8/2002 | Gossweiler et al. | 345/422 |

* cited by examiner

*Primary Examiner*—Mark Zimmerman
*Assistant Examiner*—Enrique L Santiago
(74) *Attorney, Agent, or Firm*—Carr & Ferrell LLP

(57) ABSTRACT

A system and method for providing shadow information for 3D computer graphics objects on a display for a graphic computer system are disclosed. The 3D objects are processed only once and the rendering and shadow generation information is stored in memory. In a subsequent two-dimensional pass, the shadow information is used to provide the color value at each rendered pixel. Thus, the latency and the need for storage capacity due to the multiple 3D pass processing are eliminated.

18 Claims, 2 Drawing Sheets

SHADOW RENDERING SYSTEM AND METHOD

CROSS REFERENCE TO RELATED APPLICATION(S)

This application claims the benefit of U.S. Provisional Patent Application No. 60/195,230 filed on Apr. 6, 2000, which is incorporated herein by reference thereto.

TECHNICAL FIELD

The present invention relates generally to video graphics rendering, and more particularly to the rendering of shadows.

BACKGROUND ART

In video graphics rendering, it is important to produce images that are realistic on a real-time basis. The basic difficulty in achieving total visual realism is the complexity of quickly and accurately representing real world visual effects. A scene can include a variety of textures, color gradiations, reflections, translucency, and, most particularly, shadows. Shadows enhance the realism of an image because they give a two-dimensional (2D) image the appearance of being three-dimensional.

In the past, there have been a number of different ways to determine how objects in a scene would cast shadows and how these shadows should be represented in the rendered image. In three-dimensional (3D) graphic systems, objects in a scene are represented by 3D graphic models, which indicate geometric data used to model the surface, texture, shape, and position of the objects. One of the most common ways of representing a three-dimensional object is by using polygons, or geometric primitives, which are interconnected to form the shape of the object. Various aspects of the polygons, such as color and texture, are stored for future use.

In the graphics rendering process, the primitives are processed to generate a display image. For 3D graphics, the rendering process includes transforming the objects to the coordinate system of the display device, and texture mapping the visual characteristics onto each of the primitives. Objects which are potentially visible in a particular scene are identified by transforming the objects into a common three-dimensional coordinate system and then determining whether the objects overlap in the view volume, a three-dimensional space defining the bounds of a scene. The primitives of potentially visible objects are then transformed to the display device coordinates and rasterized into pixel data. Rastering generally refers to the process of computing a pixel value for a pixel based on data from the primitive that project onto or "cover" the pixel.

As part of the rendering process, hidden surfaces are removed by determining which objects or portions of objects are and are not visible in a scene from the viewer of the device.

One approach to hidden surface removal is the Z-buffer algorithm. In this approach, a Z buffer is used to perform hidden surface removal on pixel data generated as primitives are rasterized. The letter "Z" refers to a depth value and originates from the common practice of expressing distance from the user's viewpoint as being on the Z axis in a three-dimensional coordinate system. A Z buffer is used to store pixel depth closest to the viewpoint for each pixel location in an image. As a primitive is rasterized, pixel data, including a depth value, is generated. The depth of a newly generated pixel is compared with a pixel depth stored in the Z buffer for the same pixel location. If the newly generated pixel is further from the viewpoint than the stored pixel depth, it is rejected. If not, it replaces the pixel depth stored in the Z buffer. This process continues until an entire frame of pixels is generated.

Just as objects can hide other objects from the perspective of the user viewpoint, some objects can hide other objects from the perspective of a light source. For example, objects closer to a light source can cast a shadow on other objects in the scene. The term "shadowing" refers to the process of determining which objects are behind the objects which are closer to the light source and representing the shadows in a rendered image.

In one approach, the Z buffer is used to compute shadows in two rendering passes. In the first pass, the primitives are rendered from the point of view of the light source to produce a shadow depth map, and a Z buffer is used to compute a Z value for each element in the shadow depth map representing the object closest to the light source of each element. In the second pass, each time a pixel is generated, it is transferred back into light source coordinates and compared against the value retrieved from the shadow depth map. If the Z value of the pixel in the light coordinate is less than the Z value from the shadow depth map, then the point is illuminated. Otherwise, it is in shadow.

This shadow algorithm can cause self-shadowing artifacts because only a single Z value is stored for each element in the shadow depth map. For example, if a Z value in the shadow depth map represents the distance of a single point on a curved object, the shadow depth map would improperly represent the curve surface because it would assume that the region around the single point has a constant Z value. In actuality, due to the numerical accuracy of computations, the pixels around the single point will have slightly higher or lower Z values. Thus, when the pixels are transformed into light space coordinates and compared with the single depth value to the shadow depth map, they will be erroneously determined to be shadowed.

Another problem which arises in Z-buffer techniques is caused by "aliasing" in the shadow depth map. Aliasing in the shadow depth map causes the shadows of the objects be irregular due to pixelation of the shadow map and not correspond to the shape of the object. For example in an extreme situation, a sphere which is close to a light source may have its shadow shown coursely as a jagged cross.

Most previous approaches use multiple passes to produce the 3D objects, with the first pass pre-processing and storing the shadow information, and later passes rendering the objects in the scene with appropriate shadow information. The multiple passes introduce a great deal of overhead and time delay, or latency, in the graphic pipeline.

With the importance of speed in order to obtain fast, real-time 3D graphics, a better system for shadow rendering compatible with previous self-shadowing avoidance and antialiasing techniques has been long sought but has eluded those skilled in the art.

DISCLOSURE OF THE INVENTION

The present invention provides a system and method in which three-dimensional (3D) objects are processed only once and the rendering and shadow generation information is stored in memory. In a two-dimensional (2D) pass, the shadow information is used to modulate the color value at each rendered pixel. Thus, the latency and needed storage capacity due to the multiple 3D pass processing is eliminated.

The present invention further provides for calculating shadow information using a depth-based shadow algorithm during 3D processing. The shadow information includes the depth of a 3D point viewed from the light source at each pixel on the screen. This depth value is used to update the depth value stored at its corresponding location in a shadow buffer. An indicator table is also built up to establish the correspondence between the location of the shaded pixel in the frame buffer and the location in the shadow buffer. Subsequently, the 2D process uses the indicator table to access the depth value stored at the corresponding location in the shadow buffer and compares its value with the depth value stored at the pixel. The pixel is in the shadow if the depth stored at the pixel is greater than that at the corresponding location in the shadow buffer. The shaded color at the pixel will then be modulated accordingly.

This greatly reduces the overall processing time by eliminating processing steps.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
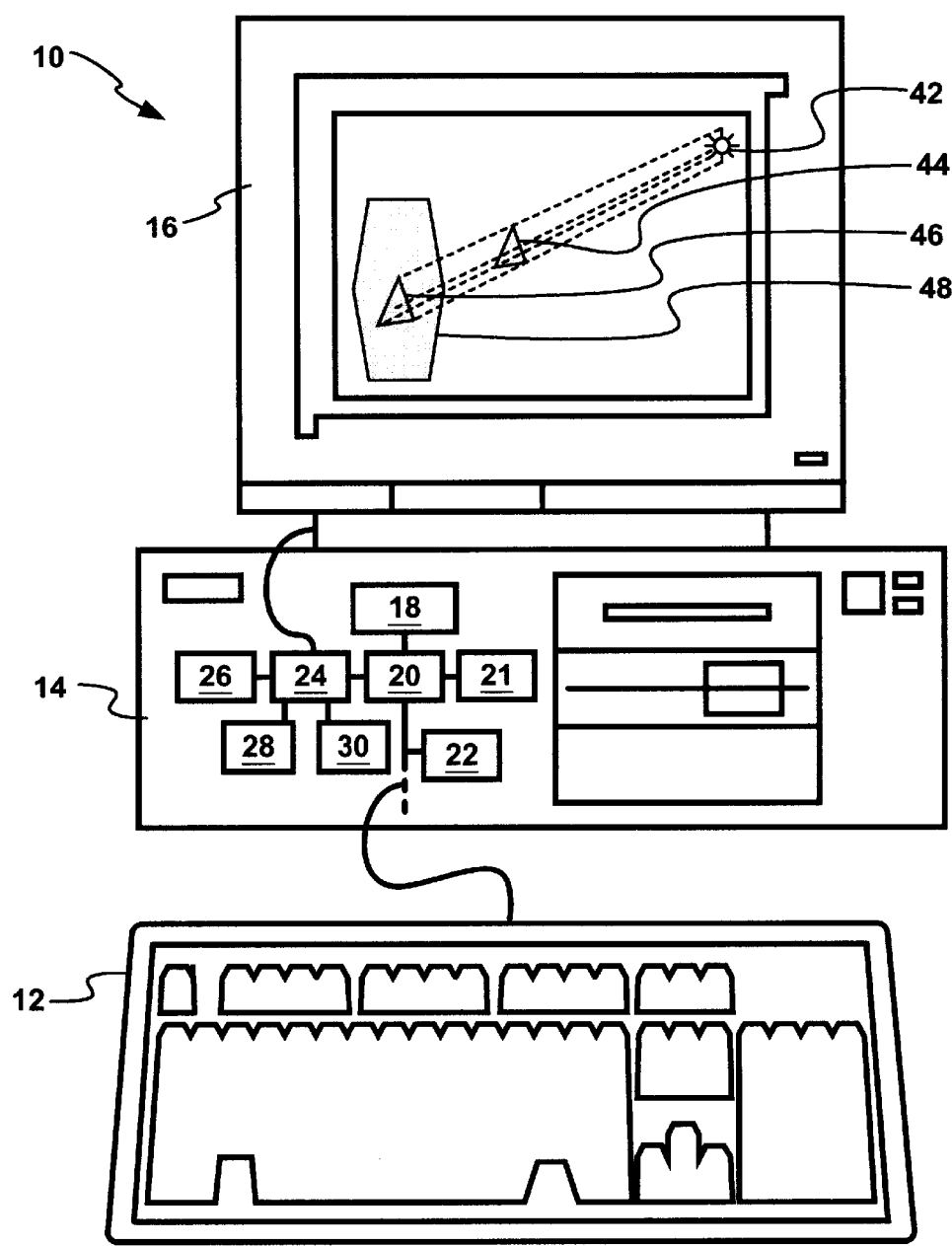
FIG. 1 shows an overview of the system incorporating the present invention.

Referring now to FIG. 1, therein is shown a computer system 10 which includes an input keyboard 12, a computer 14, and an output display 16. The computer 14 contains all the conventional components for operation of the computer system 10, including a central processing unit (CPU) 18. The CPU 18 performs most of the computation operations of the computer except those related to the output display 16. The CPU 18 is connected to a north bridge chip 20, which in turn is connected to a south bridge chip 22. The north bridge chip 20 is an interconnection chip to memory 21 and to a graphics chip 24. The south bridge chip 22 contains the peripheral components related circuitry.

The graphics chip 24 is a graphics coprocessor which performs the calculations necessary for high quality, high speed graphics, such as used in 3D games. The graphics chip 24 has a frame buffer 26, a shadow buffer 28, and memory 30 operatively associated with it although in some embodiments, they could be replaced by the memory 21 or be integrated with the graphics chip 24. The graphics chip 24 is connected to provide an output to the output display 16.

It will be understood by those skilled in the art, that other embodiments would have the functions of the north bridge chip 20, the south bridge chip 26, the graphics chip 23 integrated with the CPU 18.

On the output display 16 is shown a triangular object 44 casting a shadow 46 due to a light 42 on another object 48.

Figure 2:
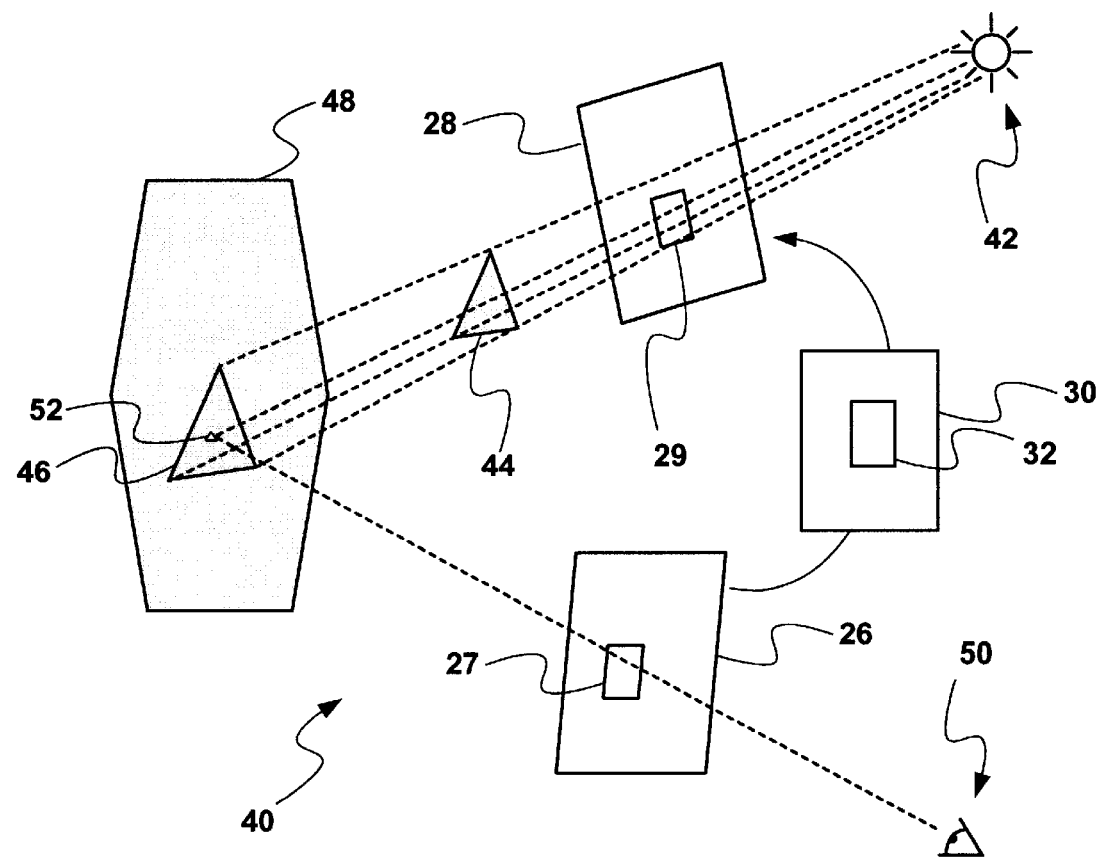
FIG. 2 is a schematic illustration of the environment and the frame buffer of the present invention.

Referring now to FIG. 2, therein is shown a shadow system 40 in its operative environment. The same elements as in FIG. 1 have the same nomenclature and numbers in FIG. 2. Thus, FIG. 2 shows schematic representations of the frame buffer 26, the shadow buffer 28, and the memory 30. The frame buffer 26 includes pixel information in a block 27, a shadow location in a block 29 in the shadow buffer 28, and an indicator table 32 in the memory 30.

In FIG. 2, the light 42 illuminates the object 44 which casts the shadow 46 on the object 48. The shadow 46 is being viewed at a view point 50. A triangle or primitive 52, which represents a portion of the object 48, is shown located within the shadow 46.

In operation, the present invention provides a system and method in which the three-dimensional (3D) objects are processed only once and the rendering and shadow generation information is stored in the memory 30. In a two-dimensional (2D) pass, the shadow information is used to modulate the color value at each rendered pixel. Thus, the latency and needed storage capacity due to the multiple 3D processing is eliminated.

First, for the 3D processing, one primitive in the object 48 is selected, such as the primitive 52, and its extent in the X-Y co-ordinate system of the output display 16 is determined.

Second, the rendering and shadow generation information for the primitive 52 is determined so, for each pixel in the output display 16 at the co-ordinate (x,y) covered by the primitive 52, the following are calculated as well-known to those skilled in the art:

a depth value $z'(x,y)$ of the corresponding point of the primitive 52 in the co-ordinate system of the light 42 to produce a shadow depth map as part of the rendering information which is then stored in the shadow buffer 28;

the light (color) intensity at the corresponding point of the primitive 52 using one of the well-known shading (lighting) models, such as RGB (red-green-blue), which is then stored in the frame buffer 26, if needed (see the fourth step below) as another part of the rendering information. The pixel attributes are given as:

$c\_d(x,y)$ is a set of intensity values for RGB (red, green, blue) light diffused by the point on the object 48 from the light source 42;

$c\_s(x,y)$ is a set of intensity values for RGB specular light reflected by a point on the object 48 from the light source 42; and $c\_a(x,y)$ is a set of intensity values for RGB light for overall sourceless light (other pixel attributes can be computed if more complex shading models are desired).

the co-ordinates $[x'(x,y), y'(x,y)]$ in the projection of the corresponding point of the primitive 52 on the shadow map plane which defines the corresponding location in the shadow buffer 28; and the depth $z(x,y)$ of the point on the object 48, if needed (using one of the Z-buffer calculations as also well-known in the art).

Third, if the z' value of the point is less than the $Z'[x',y']$ value from the shadow depth map, then the point is illuminated and the shadow buffer is updated according to the equation:

$$Z[x',y'] = \text{minimum} (Z[x',y'], z')$$

Fourth, if the point of the primitive is visible (i.e., not rejected by the Z-buffer) then it is stored in the frame buffer 26 and the table 32 as:

$$FB [x,y] = \{c\_d + c\_s, c\_a, z'\}$$

and

Table $[x,y] = [x',y']$

The steps are then repeated for other points in the primitive 52, and the next primitive is processed until the object 48 is complete.

After the 3D pass is finished and all the primitives rendered as described above, in the 2D pass for each point in the frame buffer 26 with the co-ordinates [x,y], the table 32 is used to access the z' value stored in the corresponding location in the shadow buffer 28 as defined as:

$$[x',y']=\text{Table }[x,y]$$

and $$z_0'=Z'[x',y']$$

The $z_0'$ value is then compared with the value of z' stored at the corresponding location of FB [x,y]. The pixel is in the shadow if the z' value stored at pixel FB [x,y] is greater than the $z_0'$.

The final pixel [x,y] color will be modulated according to the first equation if it is in the shadow and the second equation if it is not:

$$c=\text{shadow\_attenuation}*(c\_d+c\_s)+c\_a$$

$$c=(c\_d+c\_s)+c\_a$$

Where ($c\_d+c\_s$) and $c_{13}$ a are fetched from the corresponding location of the FB [x,y] and shadow_attenuation is some predefined coefficient associated with the light.

Further, as would be evident to those skilled in the art, the present invention can be used with different shading attributes when different shading (lighting) models are used and the shading model above should be modified accordingly. In particular, the shadow_attenuation might depend on the object and then it should be stored in FB [x,y] in the first place.

For a plurality of lights (2 through i), the above calculations would be performed for each light with a separate buffer ($Z_i'$) and table ($\text{Table}_i$) for each light and the information should be expanded in FB [x,y] and the shadow attenuation equation should be modified as well known to those skilled in the art.

Different shadow buffers 28 with different shape, size and position may be used with different types of light sources. For directional or spot lights, planar buffers may be used for each light source with each of the shadow buffers located at the minimum z value of the view-frustum.

For point lights, six planar shadow buffers are arranged in a cubic environment map with equal distances from the light source used. In this case, each shadow plane has a fixed size (e.g., 128×128).

Also, as would be evident to those skilled in the art, the present invention can be used with different shadow attenuation parameters.

Antialiasing operations may also be performed. One method is to use a percentage-closer filter when resampling z' in the shadow map. Alternatively, a 2-Z algorithm may be used to resolve self-shadowing. In this case, the shadow buffer increases its size by a factor of 2.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. Apparatus for providing shadow information of a 3D computer graphics object as an output for a graphics computer system, comprising:

polygon selection subsystem for selecting a polygon from a plurality of polygons defining the object;

rendering information determining subsystem coupled to said polygon selection subsystem for determining rendering information for said polygon in a 3D process;

polygon rendering subsystem coupled to said rendering information determining subsystem for rendering said polygon in said 3D process;

shadow generation information determining subsystem coupled to said rendering information determining subsystem and said polygon rendering subsystem for determining shadow generation information for pixels of said polygon in said 3D process, said shadow generation information including a depth value of a 3D point viewed from a light source at each pixel;

shading subsystem coupled to said shadow generation information determining subsystem for producing color values in a 2D process using said shadow generation information;

a shadow buffer for storing shadow locations;

a frame buffer for storing said each pixel;

a memory coupled to said shadow buffer and said frame buffer, said memory including an indicator table for establishing a correspondence between a location of one of said each pixel stored in said frame buffer and the location stored in said shadow buffer, wherein said shadow generation information determining subsystem uses said depth value to update a previous depth value in a corresponding location of a shadow stored in said shadow buffer.

2. The apparatus as claimed in claim 1, wherein said shadow generation information determining subsystem uses the indicator table to access said depth value at the location stored in said shadow buffer; and compares said depth value with a depth value at said corresponding location of said one of said each pixel stored in said frame buffer in a 2D process.

3. The apparatus as claimed in claim 2, wherein:

said one of said each pixel is in a shadow if said depth value is smaller than said depth value at said corresponding location of said one of said each pixel; and said one of said each pixel is not in a shadow if said depth value is greater than said depth value as said corresponding location of said one of said each pixel.

4. A method for providing shadow information of a 3D computer graphics object on a display as a graphics computer system, the graphics computer system including a shadow buffer, a frame buffer, and a memory, comprising the steps of:

selecting a polygon from a plurality of polygons defining the object;

determining rendering information for said polygon in a 3D process;

rendering said polygon using the rendering information in said 3D process;

calculating shadow generation information using a depth-based shadow algorithm during said 3D process wherein said shadow generation information includes a depth value of a 3D point viewed from a light source at each pixel;

using said shadow generation information to provide color values in a 2D process;

using said depth value to update a previous depth value in a corresponding location of a shadow stored in said shadow buffer;

generating an indicator table for establishing a correspondence between a location of one of said each pixel stored in said frame buffer and the location stored in said shadow buffer; and storing the indicator table in said memory.

5. The method as claimed in claim 4, wherein said 2D process further comprises the steps of:

using the indicator table to access said depth value stored in said shadow buffer; and comparing said depth value with a depth value at a corresponding location of said one of said each pixel stored in said frame buffer.

6. The method as claimed in claim 5, wherein:

said one of said each pixel is in a shadow if said depth value is smaller than said depth value at said corresponding location of said one of said each pixel; and said one of said each pixel is not in a shadow if said depth value is greater than said depth value at said corresponding location of said one of said each pixel.

7. Apparatus for providing shadow information of a 3D computer graphics object as an output for a graphics computer system, comprising:

polygon selection means for selecting a polygon from a plurality of polygons defining the object;

rendering information determining means coupled to said polygon selection means for determining rendering information for said polygon in a 3D process;

polygon rendering means coupled to said rendering information determining means for rendering said polygon in said 3D process;

shadow generation information determining means coupled to said rendering information determining means and said polygon rendering means for determining shadow generation information for pixels of said polygon in said 3D process, said shadow generation information including a depth value of a 3D point viewed from a light source at each pixel;

shading means coupled to said shadow generation information determining means for producing color values in a 2D process using said shadow generation information;

a shadow buffer for storing depth values wherein said shadow generation information determining means uses said depth values to update a previous depth value in a corresponding location stored in said shadow buffer;

a frame buffer for storing attributes of said each pixel; and a memory coupled to said shadow buffer and said frame buffer, said memory including indicator table means for establishing a correspondence between a location of one of said each pixel stored in said frame buffer and the location stored in said shadow buffer.

8. The apparatus as claimed in claim 7 wherein:

said shadow generation information determining means uses said indicator table means to access said depth value at the location stored in said shadow buffer and to compare said depth value with a depth value at said corresponding location of said one of said each pixel stored in said frame buffer in a 2D process.

9. The apparatus as claimed in claim 8 wherein:

said one of said each pixel is in a shadow if said depth value is smaller than said depth value at said corresponding location of said one of said each pixel; and said one of said each pixel is not in a shadow if said depth value is greater than said depth value at said corresponding location of said one of said each pixel.

10. A method for providing shadow information of a 3D computer graphics object on a display for a graphics computer system, comprising the steps of:

selecting a polygon from a plurality of polygons defining the object;

determining rendering information for said polygon in a single 3D process;

rendering said polygon output using the rendering information in said 3D process;

determining shadow generation information for said polygon in said 3D process using a depth-based shadow algorithm wherein said shadow generation information includes a depth value of a 3D point viewed from a light source at each pixel;

providing a shadow buffer for storing a depth value;

using said depth value to update a previous depth value in a corresponding location of a shadow stored in said shadow buffer;

providing a frame buffer for storing pixel attributes;

providing a memory for storing an indicator table;

generating an indicator table for establishing a correspondence between a location of one of said each pixel stored in said frame buffer and the location stored in said shadow buffer;

storing the indicator table in said memory; and using said shadow generation information to provide color values in a 2D process.

11. The method as claimed in claim 10, wherein said 2D process further comprises the steps of:

using said indicator table to access said depth value at the location stored in said shadow buffer; and comparing said depth value with a depth value at said corresponding location of said one of said each pixel stored in said frame buffer.

12. The method as claimed in claim 11, wherein:

said one of said each pixel is in a shadow if said depth value is smaller than said depth value at said corresponding location of said one of said each pixel; and said one of said each pixel is not in a shadow if said depth value is greater than said depth value at said corresponding location of said one of said each pixel.

13. A method of rendering a shadow on a 3D computer graphics object in a display image, comprising the steps of:

selecting a primitive defining at least a portion of the object, the primitive associated with at least one pixel in the display image;

determining rendering information for the primitive, wherein the rendering information includes a depth value for each pixel of the primitive based on a distance between the pixel and a view point;

determining shadow generation information for the primitive, wherein the shadow generation information includes a depth value for each pixel associated with the primitive based on a distance between the pixel and a light source;

generating an indicator table for establishing a correspondence for each pixel between the depth value of the pixel in the rendering information and the depth value of the pixel in the shadow generation information;

determining a color value for each of the pixels in the shadow; and rendering the shadow by using the depth values in the rendering information, the depth values in the shadow generation information, and the color values.

14. The method as claimed in claim 13, wherein determining a color value for each of the pixels in the shadow comprises:

obtaining intensity values for each of the pixels in the shadow;

obtaining a predefined coefficient associated with the light source; and modulating the color value of the pixels in the shadow based on the intensity values and a predefined coefficient associated with the light source.

15. The method as claimed in claim 13, wherein the primitive is a polygon.

16. A system of rendering a shadow on a 3D computer graphics object in a display image, comprising:

means for selecting a primitive defining at least a portion of the object, the primitive associated with at least one pixel in the display image;

means for determining rendering information for the primitive, wherein the rendering information includes a depth value for each pixel associated with the primitive based on a distance between the pixel and a view point;

means for determining shadow generation information for the primitive, wherein the shadow generation information includes a depth value for each pixel of the primitive based on a distance between the pixel and a light source;

means for generating an indicator table for establishing a correspondence for each pixel between the depth value of the pixel in the rendering information and the depth value of the pixel in the shadow generation information;

means for determining a color value for each of the pixels in the shadow; and means for rendering the shadow by using the depth, values in the rendering information, the depth values in the shadow generation information, and the color values.

17. The system as claimed in claim 16, wherein determining a color value for each of the pixels in the shadow comprises:

obtaining intensity values for each of the pixels in the shadow;

obtaining a predefined coefficient associated with the light source; and modulating the color value of the pixels in the shadow based on the intensity values and a predefined coefficient associated with the light source.

18. The system as claimed in claim 16, wherein the primitive is a polygon.

* * * * *